United States Patent
Fujita et al.

(10) Patent No.: US 9,486,859 B2
(45) Date of Patent: Nov. 8, 2016

(54) DRILL

(75) Inventors: Yoshihito Fujita, Tokyo (JP); Mikio Nakamura, Tokyo (JP); Hirofumi Ienaga, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 268 days.

(21) Appl. No.: 14/375,599

(22) PCT Filed: Feb. 24, 2012

(86) PCT No.: PCT/JP2012/054512
§ 371 (c)(1),
(2), (4) Date: Sep. 24, 2014

(87) PCT Pub. No.: WO2013/118311
PCT Pub. Date: Aug. 15, 2013

(65) Prior Publication Data
US 2015/0016903 A1    Jan. 15, 2015

(30) Foreign Application Priority Data
Feb. 10, 2012   (JP) .................. 2012-027409

(51) Int. Cl.
*B23Q 15/14*    (2006.01)
*B23B 49/00*    (2006.01)
(Continued)

(52) U.S. Cl.
CPC .............. *B23B 49/00* (2013.01); *B23Q 3/002* (2013.01); *B23Q 15/14* (2013.01); *B23Q 17/2233* (2013.01); *B23B 2250/16* (2013.01); *B23B 2260/128* (2013.01); *Y10T 408/08* (2015.01)

(58) Field of Classification Search
CPC .... B23Q 17/2266; B23Q 15/14; B23B 49/00
USPC .................................................. 33/638, 642
See application file for complete search history.

(56) References Cited

U.S. PATENT DOCUMENTS 4,865,494 A    9/1989  Gudow
5,086,590 A *  2/1992  Athanasiou ............. B24B 49/00
                                                   408/11
(Continued)

FOREIGN PATENT DOCUMENTS

DE    42 38 504 A1    5/1994
JP    3-60906 A       3/1991
(Continued)

OTHER PUBLICATIONS

Extended European Search Report dated Sep. 2, 2015 issued in corresponding European Application No. 12 86 8281.
(Continued)

*Primary Examiner* — Yaritza Guadalupe-McCall
(74) *Attorney, Agent, or Firm* — Birch, Stewart, Kolasch & Birch, LLP

(57) ABSTRACT

A drill that exhibits improved drill-hole depth precision is provided. Said drill, which uses a tool (T) mounted to a main shaft (16) to drill a countersunk hole (Wh) into a workpiece (W), is provided with the following: a pressure foot (17) that presses on the surface of the workpiece (W) and suppresses vibration thereof; and a displacement sensor (18) that measures the distance (L), in the axial direction of the main shaft (16), between the pressure foot (17) pressing on the workpiece (W) and the end face (16a) of the main shaft (16), which is set to a prescribed reference distance (Lo). The axial position of the main shaft (16) is corrected using a correction distance (ΔL), i.e. the difference between the distance (L) measured by the displacement sensor (18) and the reference distance (Lo). After the main shaft (16) is set to the reference distance (Lo), the main shaft (16) is moved in the axial direction thereof in accordance with the depth of the countersink part (Whb) of the countersunk hole (Wh) and the tool (T) is used to drill the hole.

4 Claims, 2 Drawing Sheets

(51) Int. Cl.
*B23Q 3/00* (2006.01)
*B23Q 17/22* (2006.01)

(56) References Cited

U.S. PATENT DOCUMENTS

| | | | | |
|---|---|---|---|---|
| 5,655,354 | A * | 8/1997 | Baker | B65B 19/34 33/201 |
| 5,735,646 | A * | 4/1998 | Finn | B23B 47/34 318/39 |
| 5,898,590 | A * | 4/1999 | Wampler | G05B 19/401 33/504 |
| 6,232,736 | B1 * | 5/2001 | Bullen | B23Q 1/012 33/1 M |
| 7,188,431 | B2 * | 3/2007 | Herrmann | B21J 15/10 33/638 |
| 7,252,466 | B1 * | 8/2007 | Roch | B23Q 17/2233 33/638 |
| 7,367,756 | B2 * | 5/2008 | Sugata | B23Q 16/001 33/642 |
| 2004/0055173 | A1 * | 3/2004 | Herrmann | B21J 15/10 33/638 |
| 2015/0016903 | A1 * | 1/2015 | Fujita | B23B 49/00 408/3 |
| 2016/0121447 | A1 * | 5/2016 | Dembeck | B23Q 17/2275 33/638 |

FOREIGN PATENT DOCUMENTS

| | | |
|---|---|---|
| JP | 10 244440 A | 9/1998 |
| JP | 2006-224261 A | 8/2006 |
| JP | 2010-64203 A | 3/2010 |
| JP | 2010-144774 A | 7/2010 |

OTHER PUBLICATIONS

International Search Report and Written Opinion of the International Searching Authority for International Application No. PCT/JP2012/054512 mailed May 1, 2012 with an English translation.

* cited by examiner

DRILL

TECHNICAL FIELD

The present invention relates to a drilling machine that can improve machining precision in an axial direction of a main shaft.

BACKGROUND ART

When a hole is drilled in the surface of a workpiece, a high-precision depth dimension may be required for the drill hole depending on the attachment state of the workpiece, the usability of the drill hole, or the like. Thus, drilling machines aiming at improving depth machining precision in the drill hole have been variously provided for a long time, and such a drilling machine is disclosed in PTL 1, for example.

CITATION LIST

Patent Literature

[PTL 1] Japanese Unexamined Patent Application Publication No. 10-244440

SUMMARY OF INVENTION

Technical Problem

The above related-art drilling machine includes a main shaft on which a tool can be mounted, and a housing that rotatably supports the main shaft and is allowed to measure an axial gap for the main shaft between the main shaft and the housing. Also, after the axial displacement of the main shaft resulting from heat deformation or the like of a machine is used as the measured gap amount, the axial position of the main shaft is corrected on the basis of the gap amount, and a drill hole is machined by a tool mounted on the main shaft.

However, since the depth dimension of the drill hole is based on the surface of the workpiece, if the axial position of the main shaft is corrected on the basis of the gap amount between the main shaft and the housing as in the related-art drilling machine, there is a concern that the depth machining precision of the drill hole may decline.

Accordingly, the invention has been made in order to solve the above-described problems and an object thereof is to provide a drilling machine that can improve depth machining precision in a drill hole.

Solution to Problem

A drilling machine related to a first aspect of the invention to solve the above problem is a drilling machine that machines a drill hole in a workpiece using a tool mounted on a main shaft. The drilling machine includes a pressing member that presses the surface of the workpiece to suppress the vibration of the workpiece; positioning means for positioning the main shaft so that an axial distance between the main shaft and the pressing member in a state where the workpiece is pressed, is a predetermined reference distance; measuring means for measuring the axial distance between the main shaft positioned by the positioning means and the pressing member in the state where the workpiece is pressed; position correcting means for obtaining a difference between the measurement distance measured by the measuring means and the reference distance as a correction distance, and correcting the axial position of the main shaft positioned by the positioning means, using the correction distance, to position the main shaft so that the axial distance between the main shaft and the pressing member in the state where the workpiece is pressed is the reference distance; and main shaft moving means for moving the main shaft positioned by the position correcting means in the axial direction thereof in accordance with the depth of the drill hole to perform drilling using the tool.

The drilling machine related to a second aspect of the invention to solve the above problem further includes correction distance determining means for determining whether or not the correction distance obtained by the position correcting means is equal to or more than a predetermined reference correction distance, stopping the correction of the axial position of the main shaft using the position correcting means when the correction distance is equal to or more than the reference correction distance, and permitting the correction of the axial position of the main shaft using the position correcting means when the correction distance is not equal to or more than the reference correction distance.

The drilling machine related to a third aspect of the invention to solve the above problem further includes correction distance difference determining means for determining whether or not a correction distance difference between the correction distance obtained by the position correcting means during the current drilling and the correction distance obtained by the position correcting means during the previous drilling is equal to or more than a predetermined reference correction distance difference, stopping the correction of the axial position of the main shaft using the position correcting means when the correction distance difference is equal to or more than the reference correction distance difference, and permitting the correction of the axial position of the main shaft using the position correcting means when the correction distance difference is not equal to or more than the reference correction distance difference.

The drilling machine related to a fourth aspect of the invention to solve the above problem further includes foreign matter adhesion determining means for determining whether or not a measurement distance difference between a maximum value and a minimum value in a plurality of the measurement distances measured by the measuring means in a state where the main shaft is rotated is equal to or more than a predetermined reference measurement distance difference, performing the measurement using the measuring means again when the measurement distance difference is equal to or more than the reference measurement distance difference, and permitting the calculation of the correction distance using the position correcting means when the measurement distance difference is not equal to or more than the reference measurement distance difference.

Advantageous Effects of Invention

Accordingly, according to the drilling machine related to the invention, the pressing member pressing the workpiece can be regarded as the workpiece by providing the pressing member capable of pressing the workpiece and by measuring, using the measuring means, the distance between the main shaft positioned before drilling and the pressing member in a state where the workpiece is pressed. Thus, the distance measured by the measuring means can be regarded as that which would be directly measured between the main shaft and the workpiece. Accordingly, depth machining precision in the drill hole can be improved by moving the main shaft whose position, has been corrected in accordance with the depth of the drill hole after the axial position of the main shaft is corrected on the basis of the measurement distance measured by the measuring means.

DESCRIPTION OF EMBODIMENTS

Hereinafter, a drilling machine related to the invention will be described in detail with reference to the drawings.

Example

Figure 1:
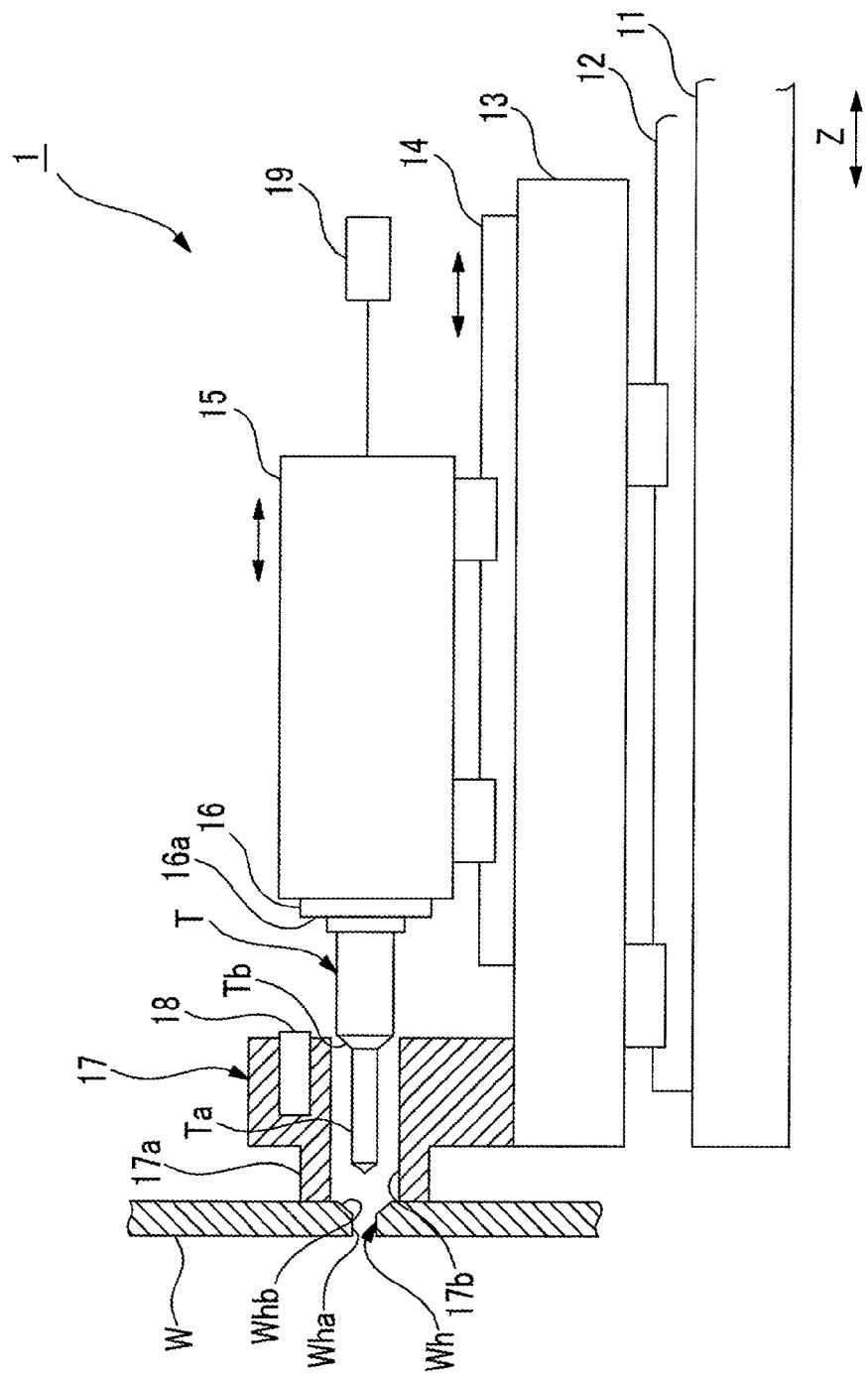
FIG. 1 is a side view of a drilling machine related to an example of the invention.
Figure 2:
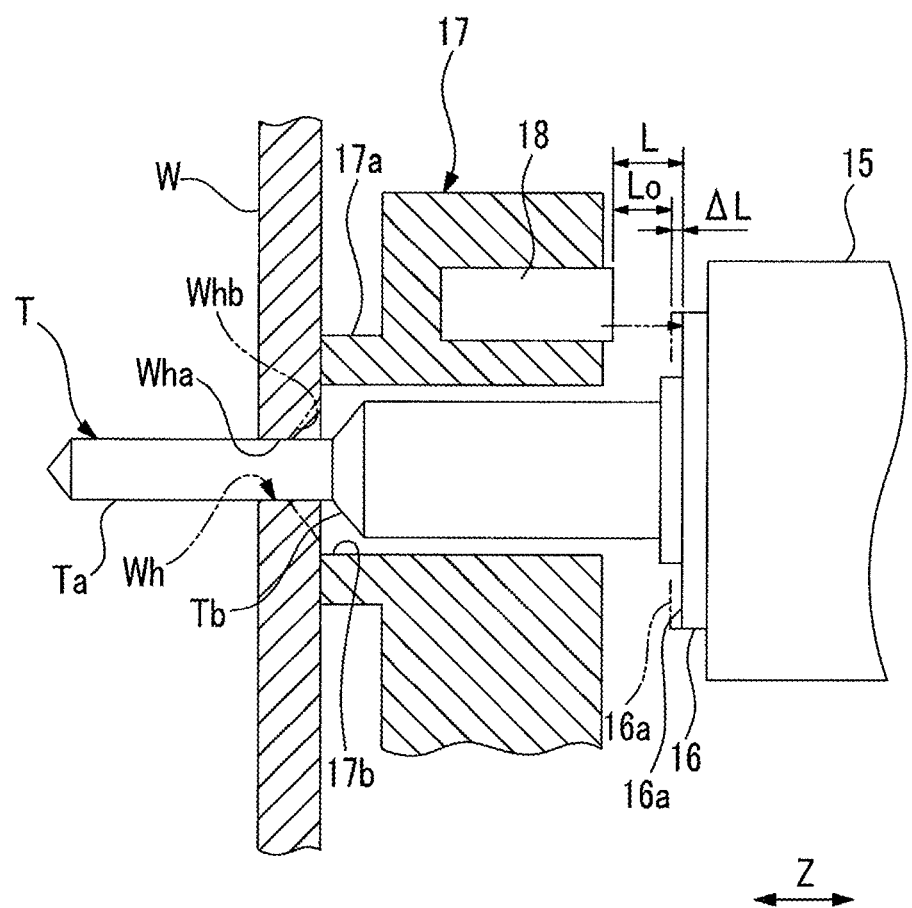
FIG. 2 is a side view of main portions showing a machining state in the drilling machine related to the example of the invention.

As shown in FIGS. 1 and 2, a bed 11 is movably supported by a drilling machine 1 that performs drilling on a workpiece W. A guide rail 12 extends in a Z-axis direction (an axial direction of a main shaft 16 to be described below) on an upper surface of the bed 11, and a movable platform 13 is supported by the guide rail 12 so as to be movable in the Z-axis direction.

Moreover, the guide rail 14 extends in the Z-axis direction on an upper surface of the movable platform 13, and a main shaft housing 15 is supported by the guide rail 14 so as to be movable in the Z-axis direction. The main shaft 16 is supported within the main shaft housing 15 so as to be rotatable around an axial center (around a Z axis) thereof, and a tool T for machining a countersunk hole is detachably mounted on a tip of the main shaft 16.

Additionally, a hollow pressure foot (pressing member) 17 is provided at a front end of the upper surface of the movable platform 13 in the Z-axis direction, that is, at the front of the guide rail 14 in the Z-axis direction. A cylindrical cylinder pressing portion 17a is formed at the pressure foot 17 so as to open in the Z-axis direction, and the cylinder pressing portion 17a presses the surface of the workpiece W during drilling to thereby prevent deviation, lifting, and chattering vibration of the workpiece W. A through-hole 17b is formed in the pressure foot 17 so as to be arranged coaxially with the main shaft 16 (tool T), and the tool T mounted on the main shaft 16 is allowed to be inserted through the through-hole 17b.

Moreover, a laser-type displacement sensor (measuring means) 18 is buried in a rear end surface of the pressure foot 17 so as to face a tip surface 16a of the main shaft 16. That is, the displacement sensor 18 is allowed to irradiate the tip surface 16a of the main shaft. 16 with output laser light to thereby measure a distance (measurement distance) L from the displacement sensor 18 to the tip surface 16a.

That is, the pressing and separation of the cylinder pressing portion 17a in the pressure foot 17 with respect to the surface of the workpiece W can be performed by moving the movable platform 13 in the Z-axis direction. Moreover, by moving the main shaft housing 15 in the Z-axis direction and rotating the main shaft 16 in a state where the tip of the cylinder pressing portion 17a is pressed against the surface of the workpiece W, drilling on the workpiece W by the tool T can be performed while inserting the tool T mounted on the main shaft 16 through the through-hole 17b of the cylinder pressing portion 17a.

In addition, the above-described tool T for machining a countersunk hole has a shaft-shaped shank Ta formed on a tip side, and a tapered taper portion Tb formed on a base end side. By performing drilling using such a tool T, a countersunk hole (drill hole) Wh is machined in the workpiece W. As a result, the countersunk hole Wh includes a hole portion (drill hole) Wha machined by the shank Ta, and a countersink portion (drill hole) Whb machined by the taper portion Tb.

Here, the above-described drilling machine 1 is provided with an NC unit (positioning means, position correcting means, main shaft moving means, correction distance determining means, correction distance difference determining means, and foreign matter adhesion determining means) 19 that controls the drilling machine 1 in an integrated manner. For example, the bed 11, the movable platform 13, the main shaft housing 15, the main shaft 16, and the displacement sensor 18, and the like are connected to the NC unit 19.

That is, the NC unit 19 can be made to independently perform the movement of the bed 11, the movable platform 13, and the main shaft housing 15, the rotation of the main shaft 16, and the measurement of the displacement sensor 18. Accordingly, drilling in the workpiece W can be achieved by controlling the axial movement and positioning of the main shaft 16 and the position correction of the positioned main shaft 16 and the position correction amount of the main shaft and determining the presence/absence of adhesion of foreign matter to the tip surface 16a of the main shaft 16, on the basis of the shape and depth machining precision of the countersunk hole Wh to be machined in the workpiece W and the measurement results of the displacement sensor 18.

Accordingly, when the countersunk hole Wh is machined in the workpiece W using the drilling machine 1, the bed 11 is first moved and the cylinder pressing portion 17a of the pressure foot 17 is made to face a hole position in the surface of the workpiece W.

Next, the movable platform 13 is advanced in the Z-axis direction, and the cylinder pressing portion 17a of the pressure foot 17 is pressed against the surface of the workpiece W with a predetermined pressing force.

Then, drilling in the workpiece W is started by rotating the main shaft 16 and advancing the main shaft housing 15 in the Z-axis direction to insert the tool mounted on the main shaft 16 through the through-hole 17b the pressure foot 17 and then bringing the tool into contact with the surface of the workpiece W.

Next, if the distance between the tip surface 16a of the main shaft 16 and the displacement sensor 18 reaches a preset predetermined reference distance Lo after the main shaft housing 15 is further advanced in the Z-axis direction, one end of the main shaft housing 15 is stopped, and the axial positioning of the main shaft 16 is performed.

In addition, the reference distance Lo in the present embodiment is a distance between the displacement sensor 18 and the end surface 16a of the main shaft 16 immediately before the taper portion Tb of the tool T reaches the hole portion Wha in a state where the shank Ta of the tool T has machined the hole portion Wha in the workpiece W. That is, the reference distance Lo is a distance between the tip surface 16a of the main shaft 16 and the displacement sensor 18 immediately before the start of machining of the countersink portion Whb by the taper portion Tb of the tool T.

Then, the displacement sensor 18 is operated to measure a distance (measurement distance) L from the displacement sensor 18 to the tip surface 16a of the main shaft 16. At this time, the main shaft 16 remains in a rotating state, and it is determined whether or not foreign matter, such as chips, has adhered to the tip surface 16a serving as a measured surface by measuring the distance L to the tip surface 16a of the main shaft 16.

Specifically, if the tip surface 16a is irradiated with the laser light of the displacement sensor 18 while rotating the main shaft 16, a plurality of distances L are continuously measured. At this time, it is determined whether a measurement distance difference between a maximum value and a minimum value among the plurality of measured distances L is equal to or more than a predetermined reference measurement distance difference that is a threshold value. Then, when the measurement distance difference is equal to or more than the reference measurement distance difference, determining that foreign matter has adhered to the tip surface 16a serving as the measured surface, the measurement using the displacement sensor 18 is performed again. On the other hand, when the measurement distance difference is not equal to or more than the reference measurement distance difference (when the measurement distance difference is less than the reference measurement distance difference), determining that foreign matter has not adhered to the tip surface 16a serving as the measured surface, the calculation of a correction distance ΔL to be described below is carried out (permitted).

Next, the axial position of the main shaft 16 (main shaft housing 15) is corrected on the basis of the above-described distance L (an average value of the plurality of distances L) when it is determined that no foreign matter has adhered to the tip surface 16a, and the reference distance Lo.

Specifically, after the correction distance ΔL that is a difference between the measured distance L and the preset reference distance Lo is obtained, the main shaft is moved by the correction distance ΔL in the axial direction thereof, using the correction distance ΔL as the axial position correction amount of the main shaft 16. Accordingly, the distance between the tip surface 16a of the main shaft 16 whose position has been corrected and the displacement sensor 18 becomes the reference distance Lo.

Here, as described above, when the correction distance ΔL is obtained, the determination as shown below is also performed.

As a first determination processing, it is determined whether or not the correction distance ΔL is equal to or more than a predetermined reference correction distance that is a threshold value. Then, when the correction distance ΔL is equal to or more than the reference correction distance, determining that a malfunction has occurred in the displacement sensor 18, the correction of the axial position of the main shaft 16 is stopped. On the other hand, when the correction distance ΔL is not equal to or more than the reference correction distance (when the correction distance is less than the reference correction distance), determining that the displacement sensor 18 is normally operating, the correction of the axial position of the main shaft 16 is carried out (permitted).

As a second determination processing, a correction distance difference that is a difference between the correction distance ΔL obtained during the current drilling and the correction distance ΔL obtained during the previous drilling is obtained, and it is determined whether the correction distance difference is equal to or more than a predetermined reference correction distance difference that is a threshold value. Then, when the correction distance difference is equal to or more than the reference correction distance difference, determining that the depth machining precision is not uniform, the correction of the axial position of the main shaft 16 is stopped. On the other hand, when the correction distance difference is not equal to or more than the reference correction distance difference (when the correction distance difference is less than the reference correction distance difference), determining that the depth machining precision is uniform, the correction of the axial position of the main shaft 16 is carried out (permitted).

Then, as described above, the main shaft housing 15 whose position has been corrected is moved by the depth of the countersink portion Whb in the Z-axis direction. Accordingly, the countersink portion Whb is further machined by the taper portion Tb of the tool T in the hole portion Wha of the workpiece W machined by the shank Ta, and consequently, the countersunk hole Wh is formed in the workpiece W.

Accordingly, according to the drilling machine 1 related to the invention, the pressure foot 17 pressing the workpiece W can be regarded as the workpiece W by providing the pressure foot 17 capable of pressing the workpiece W with the displacement sensor 18 and by measuring, using the displacement sensor 18, the distance from the pressure foot 17 in a state where the workpiece W is pressed to the end surface 16a of the main shaft 16 positioned before drilling. Thus, the distance L measured by the displacement sensor 18 can be regarded as that which would be directly measured between the main shaft 16 and the workpiece W. Accordingly, the depth machining precision of the countersink portion Whb can be improved by moving the main shaft 16, whose position has been corrected, in accordance with the depth of the countersink portion Whb in the countersunk hole Wh after the axial position of the main shaft 16 is corrected on the basis of the correction distance ΔL that is the difference between the distance L measured by the displacement sensor 18 and the preset reference distance Lo.

Additionally, malfunctions, such as the failure and poor attachment of the displacement sensor 18 can be detected by determining whether or not the correction distance ΔL is equal to or more than the predetermined reference correction distance.

Moreover, by determining whether or not the correction distance difference that is the difference between the correction distance ΔL obtained during the current drilling and the correction distance ΔL obtained during the previous drilling is equal to or more than the predetermined reference correction distance difference, uniformity of the depth machining precision can be achieved in countersink portions Whb of all countersunk holes Wh to be machined even in a case where a plurality of countersunk holes Wh are machined in the workpiece W.

Moreover, in the plurality of measured distances L, the presence/absence of adhesion of foreign matter to the tip surface 16a serving as the measured surface can be detected by determining whether or not the measurement distance difference between the maximum value and the minimum value is equal to or more than the predetermined reference measurement distance difference. This can prevent erroneous measurement in the displacement sensor 18.

INDUSTRIAL APPLICABILITY

The invention can be applied to a drilling device that can machine a drill hole in a curved surface of a workpiece with high depth precision.

The invention claimed is:
1. A drilling machine that machines a drill hole in a workpiece using a tool mounted on a main shaft, the drilling machine comprising:

a pressing member that presses the surface of the workpiece to suppress the vibration of the workpiece;

positioning means for positioning the main shaft so that an axial distance between the main shaft and the pressing member in a state where the workpiece is pressed, is a predetermined reference distance;

measuring means for measuring the axial distance between the main shaft positioned by the positioning means and the pressing member in the state where the workpiece is pressed;

position correcting means for obtaining a difference between the measurement distance measured by the measuring means and the reference distance as a correction distance, and correcting the axial position of the main shaft positioned by the positioning means, using the correction distance, to position the main shaft so that the axial distance between the main shaft and the pressing member in the state where the workpiece is pressed is the reference distance; and main shaft moving means for moving the main shaft positioned by the position correcting means in the axial direction thereof in accordance with the depth of the drill hole to perform drilling using the tool.

2. The drilling machine according to claim 1, further comprising:

correction distance determining means for determining whether or not the correction distance obtained by the position correcting means is equal to or more than a predetermined reference correction distance, stopping the correction of the axial position of the main shaft using the position correcting means when the correction distance is equal to or more than the reference correction distance, and permitting the correction of the axial position of the main shaft using the position correcting means when the correction distance is not equal to or more than the reference correction distance.

3. The drilling machine according to claim 1, further comprising:

correction distance difference determining means for determining whether or not a correction distance difference between the correction distance obtained by the position correcting means during the current drilling and the correction distance obtained by the position correcting means during the previous drilling is equal to or more than a predetermined reference correction distance difference, stopping the correction of the axial position of the main shaft using the position correcting means when the correction distance difference is equal to or more than the reference correction distance difference, and permitting the correction of the axial position of the main shaft using the position correcting means when the correction distance difference is not equal to or more than the reference correction distance difference.

4. The drilling machine according to claim 1, further comprising:

foreign matter adhesion determining means for determining whether or not a measurement distance difference between a maximum value and a minimum value in a plurality of the measurement distances measured by the measuring means in a state where the main shaft is rotated is equal to or more than a predetermined reference measurement distance difference, performing the measurement using the measuring means again when the measurement distance difference is equal to or more than the reference measurement distance difference, and permitting the calculation of the correction distance using the position correcting means when the measurement distance difference is not equal to or more than the reference measurement distance difference.

* * * * *